(12) United States Patent
Kiselev et al.

(10) Patent No.: US 7,546,429 B1
(45) Date of Patent: Jun. 9, 2009

(54) METHOD OF DETECTION OF DATA CORRUPTION IN MIRRORED STORAGE

(75) Inventors: Oleg Kiselev, Palo Alto, CA (US); Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 26 days.

(21) Appl. No.: 11/590,324

(22) Filed: Oct. 31, 2006

Related U.S. Application Data

(60) Division of application No. 10/742,129, filed on Dec. 19, 2003, now Pat. No. 7,177,993, which is a continuation-in-part of application No. 10/610,604, filed on Jul. 1, 2003, now Pat. No. 7,028,156.

(51) Int. Cl.
  *G06F 11/30* (2006.01)
(52) U.S. Cl. .......................................... 711/162; 714/6
(58) Field of Classification Search ................. 711/162; 714/6
  See application file for complete search history.

(56) References Cited

U.S. PATENT DOCUMENTS

| | | | |
|---|---|---|---|
| 6,321,298 B1 | 11/2001 | Hubis | 711/124 |
| 6,701,451 B1 * | 3/2004 | Cohen et al. | 714/5 |
| 6,910,178 B1 | 6/2005 | Kiselev et al. | 711/819 |
| 6,993,677 B1 * | 1/2006 | Wilner | 714/6 |
| 7,096,332 B1 | 8/2006 | Kiselev et al. | 711/162 |
| 7,177,993 B1 | 2/2007 | Kiselev et al. | 711/162 |
| 2003/0145270 A1 | 7/2003 | Holt | 714/766 |
| 2003/0167439 A1 | 9/2003 | Talagala et al. | 714/770 |
| 2004/0205298 A1 | 10/2004 | Bearden et al. | 711/137 |

OTHER PUBLICATIONS

Oleg Kiselev et al., "Method of Data Caching in Mirrored Storage," U.S. Appl. No. 10/749,862, filed on Dec. 31, 2003, Specification pp. 1-15 and Drawings pp. 1-3.

* cited by examiner

*Primary Examiner*—Kevin Ellis
*Assistant Examiner*—Jared I Rutz
(74) *Attorney, Agent, or Firm*—Campbell Stephenson LLP

(57) ABSTRACT

A first read request is received from a computer system. Data from one mirror of a data volume is returned to the computer system in response to receiving the first read request. The computer system may check the returned data to determine whether it is corrupted. If corrupted, the computer system sends a second read request for the same data. Rather than returning the same corrupted data stored in the one mirror, a copy of the requested data is returned from an alternate mirror of the data volume.

11 Claims, 5 Drawing Sheets

| n | Data Identification | Mirror Read History | Time Stamp | |
|---|---|---|---|---|
| 1 | Block 4 | $M_0$ | $T_0$ | 66 |
| 2 | Block 15 | $M_0, M_1$ | $T_1$ | |
| 3 | Block 10 | $M_0, M_1, M_2$ | $T_2$ | |
| 4 | Block 27 | $M_0, M_1, M_2$ | $T_8$ | |
| 5 | Block 2 | $M_0$ | $T_6$ | |
| 6 | Block 85 | $M_0, M_1$ | $T_{12}$ | |

METHOD OF DETECTION OF DATA CORRUPTION IN MIRRORED STORAGE

This application is a divisional of application Ser. No. 10/742,129, filed in the U.S. Patent Office on Dec. 19, 2003, entitled "Method of Detection of Data Corruption in Mirrored Storage, now U.S. Pat. No. 7,177,993, which issued on Feb. 13, 2007; which is a continuation-in-part of application Ser. No. 10/610,604, filed in the U.S. Patent Office on Jul. 1, 2003, entitled "Use of Read Data Tracking and Caching to Allow Cooperating Application to Recover from Data Corruption," now U.S. Pat. No. 7,028,156, which issued on Apr. 11, 2006. The foregoing applications are incorporated herein by reference.

BACKGROUND OF THE INVENTION

Many businesses employ a data system in which one or more memory devices (e.g., data storage disks) store critical data. The number of memory devices employed in a data system varies as a function of the data storage demands. As will be more fully described below, however, the frequency of data corruption incidents increases with the number of memory devices used to store data.

FIG. 1 shows a data system in which a computer system 10 is coupled to a host node 12. Host node 12, in turn, is coupled to data-storage systems 14-18. Each of data-storage systems 14-18 includes memory devices 24-28, respectively, for storing data. Each of the memory devices 24-28 may include several components (e.g., data storage disks). For purposes of explanation, memory devices 24-28 contain a single data storage disk, it being understood that the term memory device should not be limited thereto.

The data storage disks 24-28 store a mirrored data volume. For purposes of explanation, the mirrored volume includes three mirrored data volumes or mirrors. One mirror is designated as a primary. Disk 24 stores the primary. Disks 26 and 28 store the mirrored copies of the primary. The primary is the working data volume for the system shown in FIG. 1 in that host node 12 reads data from or writes data to the primary in response to a read or write request from client computer system 10 or other client computer systems (not shown). Host node 12 may take form in a computer system (e.g., a server computer system).

The mirrors in disks 26 and 28 act as redundant backups to the primary. When host node 12 writes new data to the primary, the same data is written to each of the mirrors in disks 26 and 28. Host node 12 does not consider a write of data complete until data has been written to all available mirrors including the mirrors in disks 26 and 28. As such, each mirror is maintained as a real-time copy of the primary. The mirrors of disks 26 and 28 are typically provided as backup solutions if the primary in disk 24 is rendered inaccessible as the result of hardware or software failure. Thus, if disk 24 suddenly becomes inaccessible, host node 12 can continue to service read or write requests from client computer system 10 using a mirror in disk 26 or 28. Because all mirrors contain identical data, the mirrors are also used to improve read performance of the data volume by directing multiple simultaneous read operations to different mirrors, to be executed simultaneously.

Failure of disk 24 is one problem facing businesses that employ large scale data storage systems. Data corruption is another problem. Data corruption has many sources. Data corruption can occur, for example, when host node 12 fails to properly overwrite old data with new data. To illustrate, suppose host node 12 seeks to overwrite old data $D_{old}$ in the primary with new data $D_{new}$ in response to a write request received from computer system 10. As a result of improper operation of hardware or software, new data $D_{new}$ is inadvertently written to a track in disk 24 near the disk track that stores the old data $D_{old}$. This type of data corruption is often referred to as mis-tracking. Yet another example of data corruption may occur when one or more bits in new data $D_{new}$ are inadvertently flipped just before the new data $D_{new}$ is written to disk 24. This type of data corruption is often referred to as bit-flipping and often occurs while data is handled in transit to its ultimate storage location. As a result of bit-flipping, the track that stores old data $D_{old}$ is overwritten with bad data. Another type of error corruption can occur when new data $D_{new}$ is not written to the disk at all even though the host node 12 believes the new data $D_{new}$ to be written. When any of these types of errors occur, one or more instances of data corruption may occur on disk 24.

Host node 12 may not be aware that the disk storage device contains corrupted data. To illustrate this effect, suppose host node 12 receives a first request to read data identified by some name (e.g., a block ID or a filename). Host node 12 accesses and reads data stored in disk 24 on one or more blocks corresponding to the name of the data sought. The blocks, however, contain data corrupted as a result of mis-tracking. Host node 12 may lack the ability to determine whether the data read from disk 24 is corrupted. As such, host node 12 may unwittingly return a copy of the corrupted data to computer system 10.

Client computer system 10, however, may be able to detect data corruption. Client computer system 10 may perform a checking algorithm on the data returned by host node 12 to identify data corruption. If computer system 10 recognizes that the data returned is corrupted, the computer system may send a second request for the same data. Unfortunately, host node 12 is likely to once again return the same corrupted data from disk 24 in response to the second request.

SUMMARY OF THE INVENTION

In one embodiment, a first read request is received from a computer system. Data from a mirror of a data volume is read and returned to the computer system in response to receiving the first read request. The computer system may check the returned data to determine whether it is corrupted and attempt another read of data. If the second read request arrives within a predetermined interval after the first one, then rather than returning the data stored in the previously accessed mirror, a copy of the requested data is returned from a different mirror of the data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
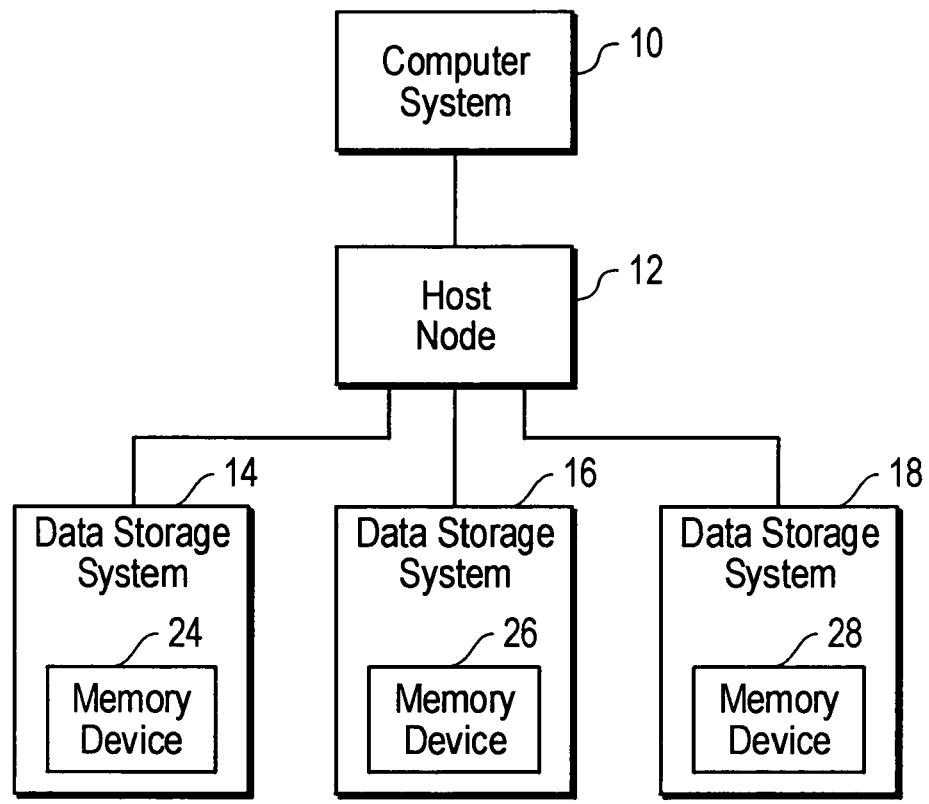
FIG. 1 is a block diagram of a prior art data storage system.
Figures 2, 3:
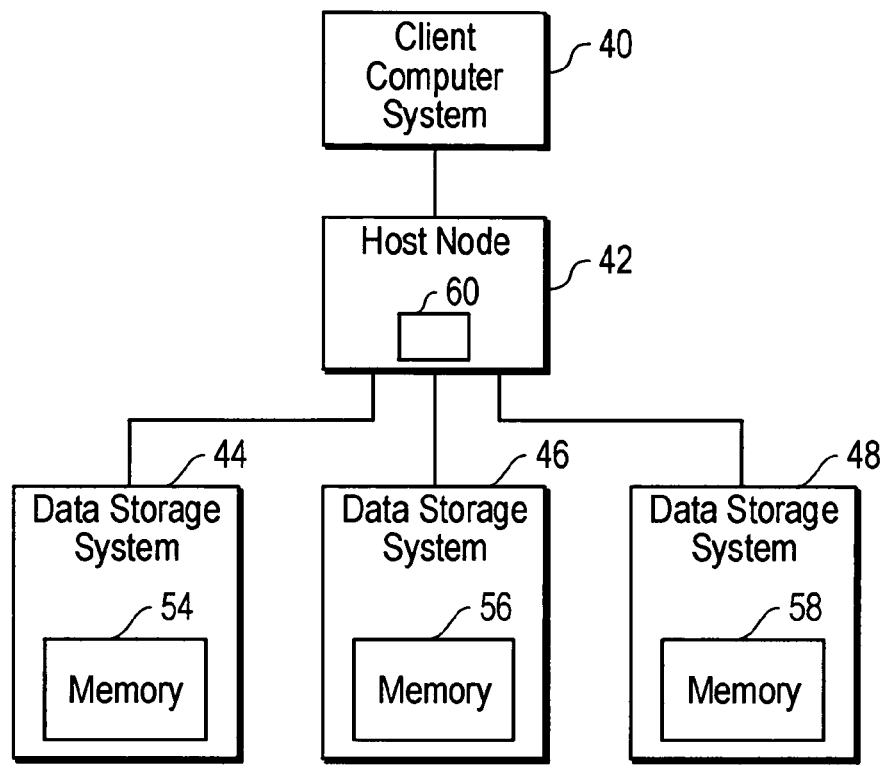
FIG. 2 is a block diagram of a data storage system employing one embodiment of the present invention.
FIG. 3 is a block diagram of a read history employed in one embodiment of the present invention.

FIG. 2 illustrates relevant components of a data system employing one embodiment of the present invention. More specifically, FIG. 2 shows, in block-diagram form, a client computer system 40 coupled to a host node 42. Although not shown, additional client computer systems may be coupled to host node 42. Host node 42, in turn, is coupled to data-storage systems 44-48. Host node 42 will be described as having direct data read and write access to data-storage systems 44-48, it being understood that the present invention should not be limited thereto.

Each of data-storage systems 44-48 includes memories 54-58, respectively. Each of the memories 54-58 may take form in one or more dynamic or static random-access memories, one or more arrays of magnetic or optical data-storage disks, or combinations thereof. Memories 54-58 should not be limited to the foregoing hardware components; rather, the memories may take form in any hardware, software, or combination of hardware and software in which data may be persistently stored and accessed. Further, the memories may take form in a complex construction of several hardware components operating under the direction of software or hardware. For purposes of explanation only, each of the memory devices 54-58 will take form in a single data storage disk, it being understood that the present invention should not be limited thereto.

Host node 42 may take form in a computer system (e.g., a server computer system) having a memory (not shown) for storing instructions that, when executed by host node 42, implements an embodiment of the present invention. Host node 42 may include a data-storage management system (not shown) that takes form in software instructions executing on one or more processors (not shown). The data-storage management system may include, in one embodiment, a file system and a system for managing the distribution of data across multiple memory devices. VERITAS Volume Manager™ provided by VERITAS Software Corporation of Mountain View, Calif., is an exemplary system for managing the distribution of data of a volume across one or more memory devices.

Disks 54-58 store a mirrored volume. For purposes of explanation, the mirrored volume includes three mirrors or identical copies of volume data. One mirror is often designated as the primary or preferred mirror for a specific I/O or for all I/Os. For purposes of explanation, mirror $M_0$ is going to be designated as the preferred mirror. As is well known in the art, write operations are sent to all mirrors of a mirrored volume, while read operations can be satisfied from any of the mirrors. However, reads are often sent to the mirrors designated as preferred to gain better performance by taking advantage of read-ahead caches on disks and disk arrays, as well as to optimize for non-uniform connectivity latencies in the storage interconnects. In FIG. 2, disk 54 will be described as storing mirror $M_0$, while disks 56 and 58 store mirrors $M_1$ and $M_2$, respectively. The primary mirror $M_0$ acts as the preferred target of read operations for the data system in FIG. 2. Mirrors $M_1$ and $M_2$ act as redundant, up-to-date backups to mirror $M_0$. If disk 54 is rendered inaccessible due to hardware or software failure, host node 42 can respond to a read or write request from computer system 40 using data copies $M_1$ or $M_2$. The foregoing storage layout description should not be taken as the only way of storing data volumes. Each mirror may span or stripe differently across multiple data storage systems. The number of mirrors need not be limited to 3, it can be as low as 2 or arbitrarily large. In some configurations some mirrors may be sparse and not map all of the data of the volume. In some implementations one or more of the mirrors may be log-structured or have some other complex data organization.

Computer system 40 generates requests to read data. Each request identifies the data sought by a unique name (e.g., a filename or block ID). Host node 42 receives the read data requests from computer system 40. As will be more fully describe below, if the read data request is an initial request for the data, host node 12 reads and returns the requested data from the primary mirror $M_0$. Computer system 40 may perform a checking algorithm to determine whether the returned data is corrupted. If computer system 40 determines that the returned data is corrupted, computer system 40 may generate a second request for the same data, on the assumption that this data corruption is due to hardware or software errors such as transient errors in the I/O subsystem. The second request is transmitted to host node 42. As will be more fully described below, rather than return the data from the same primary mirror $M_0$ in response to receiving the second request, host node 42 will return a copy of the requested data from one of the alternate mirrors, here $M_1$ or $M_2$. Chances of data corruption on a mirror are small, and chances that the mirrored copy of the requested data is also corrupted are dramatically lower. It can be shown that with the increase of the number of mirrors, the chances of all copies of the requested data being corrupted approach zero.

Host node 42, in one embodiment, includes a memory 60 for storing a searchable history of read requests 66, such as the table 66 shown (in one embodiment) in FIG. 3. Host node 42 uses the read history 66 to determine whether a read data request from computer system 40 is an initial request (if it is, host node 42 will return the requested data from the primary data mirror $M_0$) or a subsequent request (if it is, host node 42 may return a copy of the requested data from mirror $M_1$ or $M_2$). In the history shown in FIG. 3, each entry has three fields including: a data identification field that identifies data by a unique identifier (e.g., a block ID, file name and offset, or object ID and offset); a mirror read history field identifying a set of mirrors (i.e., $M_0$, $M_1$, $M_2$, etc.) from which data has been returned in the past; and a time stamp field indicating the time when the history entry was created or last updated. Host node 42 can modify the contents of any entry in history 66. It is noted that host node 42 may store a separate read history in memory 60 for each client computer system that provides host node 42 with requests to read data. However, for purposes of explanation, it will be presumed that only history 66 is stored in memory 60, and that history 66 is associated with client computer system 40. It is further noted that memory 60 may be located externally to host node 42.

Figure 4:
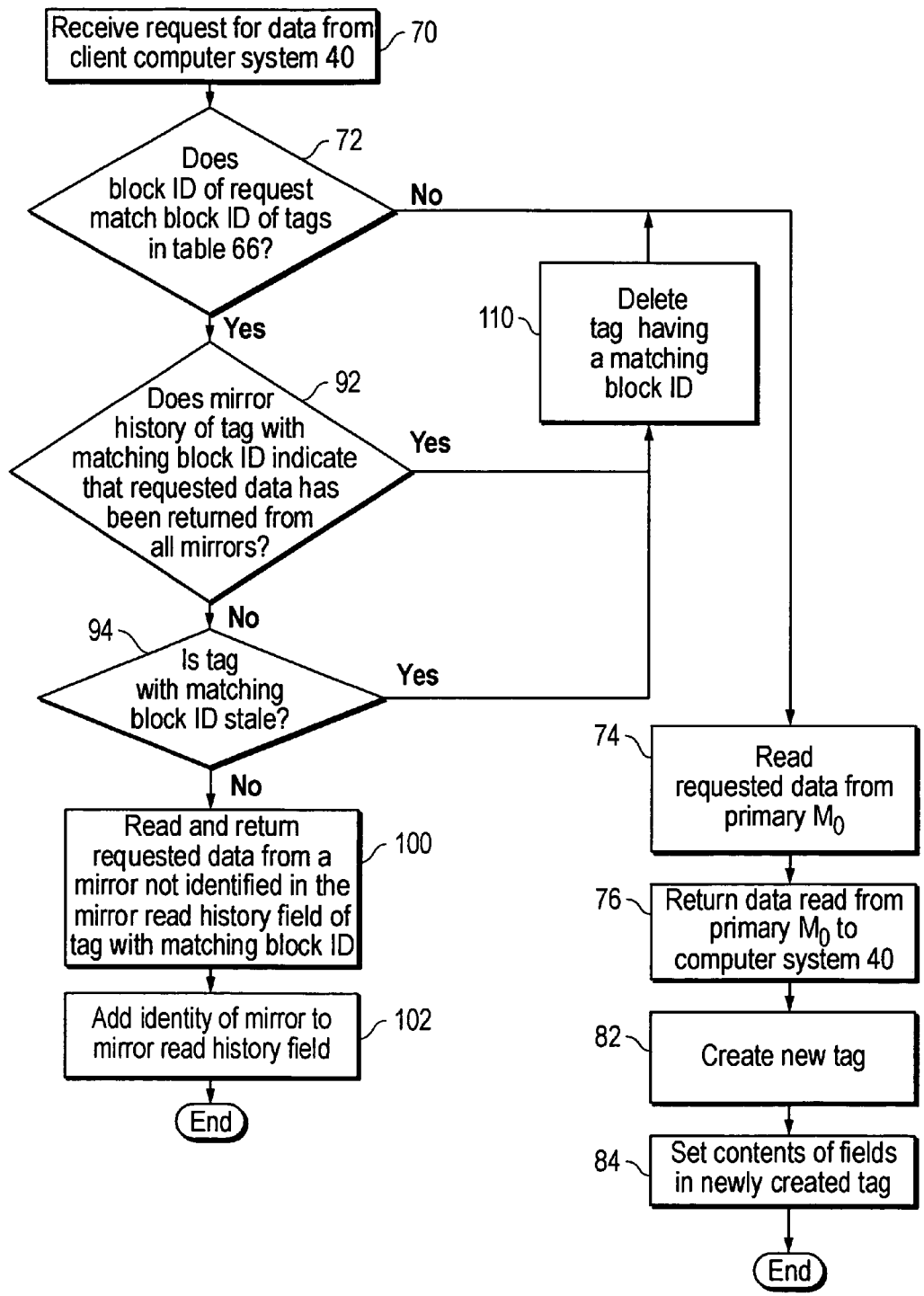
FIG. 4 is a flow chart illustrating operational aspects of responding to a request to read data in the data storage system of FIG. 2 according to one embodiment of the present invention.

FIG. 4 is a flow chart illustrating relevant operational aspects performed by host node 42 to determine which mirror (i.e., the primary $M_0$ or one of alternate mirrors $M_1$ or $M_2$) should be used to service a read data request from computer system 40 according to one embodiment of the present invention. The process shown in FIG. 4 begins with step 70 when host node 42 receives a request from computer system 40 to read data. This request includes an identifier (e.g., a filename and offset, block ID, extent ID and offset, etc.) that uniquely identifies the requested data. For purposes of explanation, the present invention will be described with read requests identifying data sought using a block ID. It is noted that each of the mirrors in the data volume consists of a plurality of data blocks. While each of these data block is said to store data, in reality, data of each block is stored in a physical memory block of memory 54, 56, or 58 allocated thereto. The block ID can identify either the data block of a mirror or the physical memory block allocated thereto.

Host node 42 in step 72 accesses history 66 (FIG. 3) to determine whether the block ID of the received request matches the block ID of any of the entries. If the request received in step 70 is an initial request for the data, there will be no match between the block IDs in the history entries and the block ID of the requested data. Presuming no match in step 72, the process proceeds to step 74 where host node 42 reads the requested data from the primary mirror $M_0$. In step 76, host node 42 returns the data read from the primary mirror $M_0$ to computer system 40.

In step 82, host node creates a new entry in read history 66. In step 84 host node 42 sets the contents of the newly entry. More particularly, host node 42 stores the block ID of the requested data into the data identification field of the newly created entry. Host node 42 stores the current time $T_c$ into the time stamp field of each newly created entry. Lastly, host node 42 stores mirror identity $M_0$ into the read history field thus indicating that data from mirror $M_0$ has been returned to computer system 40. As an aside, it is noted that at any point host node 42 may modify data in the volume, and thereby in the mirrors $M_0$, $M_1$ and $M_2$, in response to receiving a write data transaction. This will make the history entry for the modified data blocks irrelevant. Therefore, in some implementations, before modification, host node 42 may delete any entry in read history 66 that corresponds to data that is modified.

The data returned to computer system 40 in step 76 may be corrupted as the result of, for example, a prior mis-tracking event. Computer system 40 will check the validity of the data returned to it in step 76. If the validity check fails, computer system 40 may generate a second request for the same data, in order to work around a presumed possibility of, for example, a transient I/O subsystem malfunction. Again, it is noted that the second request will use the same data identifier (block ID) as the initial request.

Presuming the request received in step 70 is a second or subsequent request, host node 42 in step 72 should find a match between the block ID of the second or subsequent request and the block ID of an entry in read history 66. When that match is discovered, the process proceeds to step 92 where host node 42 determines whether the read history entry with the matching block ID indicates in its mirror read history field that the requested data from each of the mirrors $M_0$, $M_1$, and $M_2$ has been returned to computer system. If the requested data has been returned to computer system 40 from each of the mirrors (i.e., the identity of the mirrors $M_0$, $M_1$, and $M_2$ is stored in the read history field of the read history entry having the matching block ID), the process proceeds to step 110 where host node deletes the entry having the matching block ID. Thereafter host node 42 implements steps 74-84 and creates a new entry. In some embodiments, rather than deleting the old history entry, host node 42 can clear and reset the mirror access history field of the old entry and reuse the entry.

If host node 42 finds an entry that fits the criteria of step 92, then an alternate copy of the requested data from one of the alternate mirrors may be available for computer system 40. The process proceeds to step 94 where host node 42 determines whether the read history entry having the matching block ID, is "stale." As noted, client computer system 40 generates a second or subsequent request for the same data when client computer system 40 determines that previously returned data is corrupted. It will be presumed that a second or subsequent computer system 40 request for data is generated soon after the previously returned data was found to be corrupted. If a read history entry with matching block ID is older than a predetermined amount of time, it is assumed that the current read request is independent and unrelated to the read request event stored in the read history. Host node 42 determines whether history entry is stale in step 94 by comparing the current time with the time stamp of the history entry having a matching block ID. In step 94, if host node 42 determines that the read history entry having a matching block ID is stale, then host node 42 deletes the stale history entry in step 110 before proceeding to perform steps 74-90. In some implementations the host node 42 may "recycle" the stale entry instead of deleting it.

If the time stamp is less than a predetermined amount of time latter than the current time, the history entry with the matching block ID is not stale, and the process proceeds to 100 where host node 42 reads and returns to computer system 40 data read from a mirror not identified in the read history field of the read history entry with a matching block ID. In step 102, host node 42 updates the read history field by adding the identity of the mirror from which data was read in step 100 and updates the time stamp to the current time.

Figures 5, 5A:
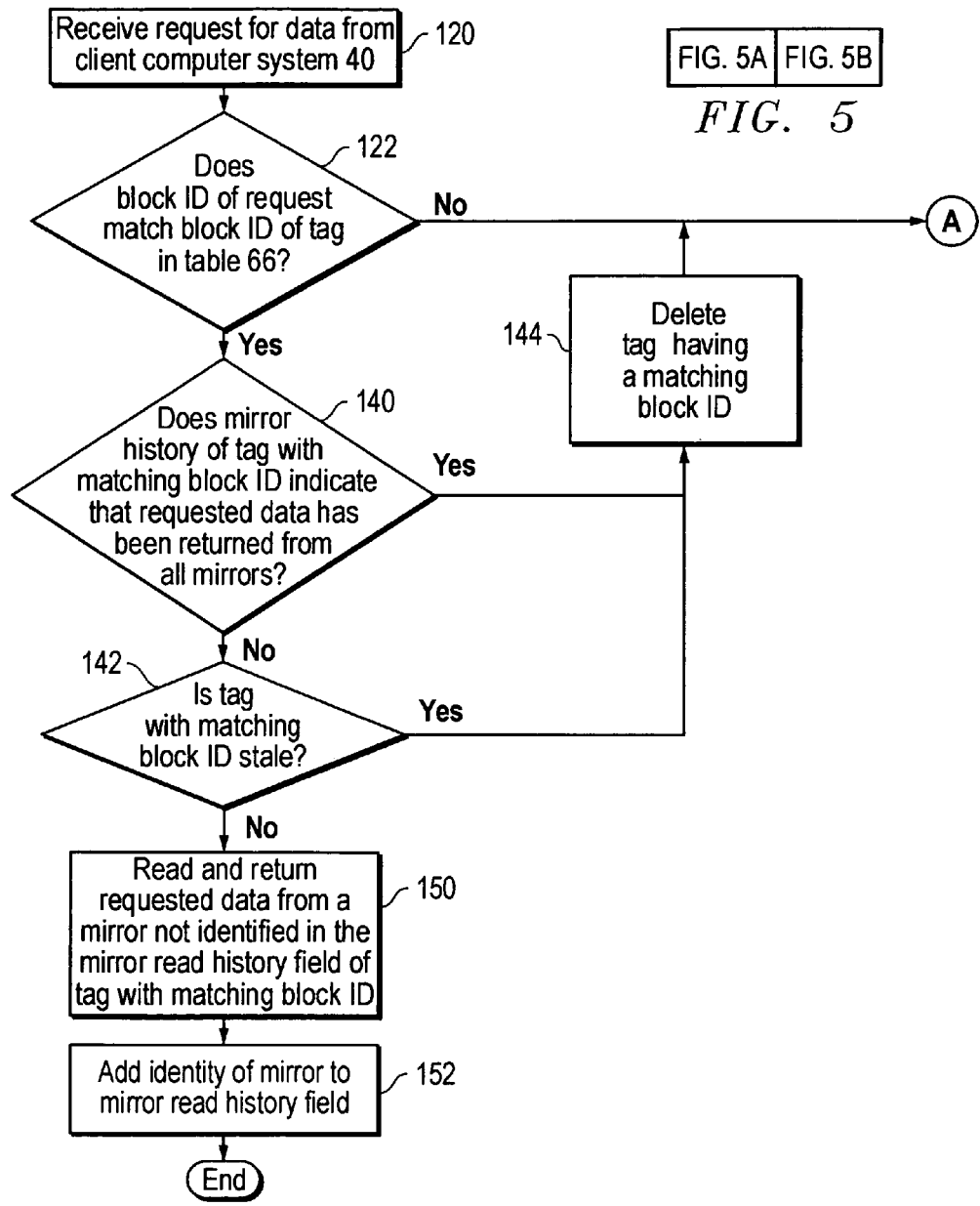
FIG. 5 is a flow chart illustrating operational aspects of responding to a request to read data in the data storage system of FIG. 2 according to another embodiment of the present invention.
Figure 5B:
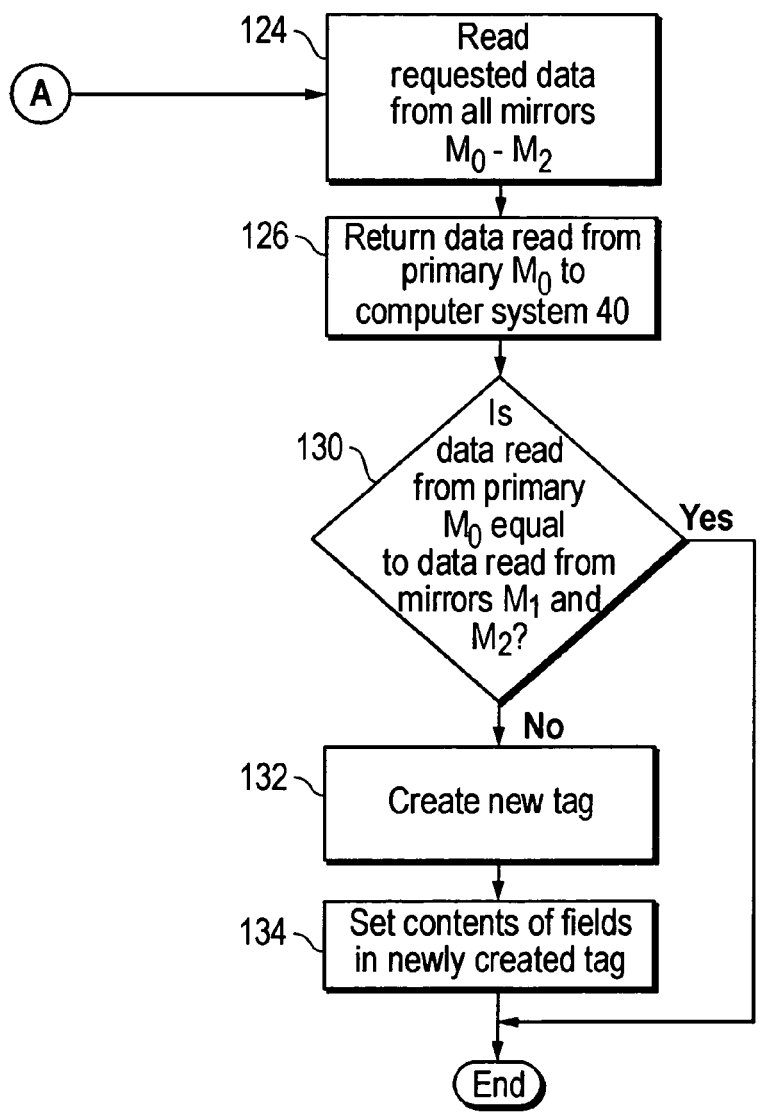

FIG. 5 is a flow chart illustrating relevant operational aspects performed by host node 42 according to another embodiment of the present invention. The process shown in FIG. 5 begins with step 120 in which host node 42 receives a request from computer system 40 to read data identified by, e.g., a block ID. Host node 42 in step 122 accesses read history 66 (FIG. 3) to determine whether the block ID of the received request matches the block ID of any of the history entries. If no history entry with a matching block ID is found, the process proceeds to step 124 where host node 42 reads the requested data from all mirrors of the volume, $M_0$, $M_1$ and $M_2$. In step 126, host node 42 returns the data read from the primary mirror $M_0$ to computer system 40.

In step 130, host node 42 compares the data read from primary mirror $M_0$ with data read from mirrors $M_1$ and $M_2$. Under normal circumstances, the data read from primary mirror $M_0$ should be identical to the data read from mirrors $M_1$ and $M_2$. However, due to a data corruption event, the data read from the primary mirror $M_0$ may not be identical to the data read from mirrors $M_1$ and $M_2$. If the requested data of the primary mirror $M_0$ is identical to its copies in mirrors $M_1$ and $M_2$, the process ends. If, in step 130, data read from the primary mirror $M_0$ is not identical the data read from both mirrors $M_1$ and $M_2$, the data returned to computer system 40 in step 126 may be corrupted, and the process proceeds to step 132.

In step 132, host node creates a new entry in read history 66. In step 134 host node 42 sets the contents of the newly created entry. More particularly, host node 42 stores the block ID of the requested data into the data identification field of the newly created entry. Host node 42 stores the current time $T_c$ into the time stamp field of each newly created entry. Lastly, host node 42 stores mirror identity $M_0$ into the mirror read history field thus indicating that data from mirror $M_0$ has been returned to computer system 40. U.S. patent application Ser. No. 10/098,285 entitled System and Method for Resolving Data Inconsistencies with a Data Majority was filed Mar. 15, 2002 and is incorporated herein by reference.

The data returned to computer system 40 in step 126 may be corrupted as the result of, for example, a prior mis-tracking event. Computer system 40 may check the validity of the data returned to it in step 126. If the validity check fails, computer system 40 may generates a second request for the same data in order to work around a presumed transient failure in the I/O subsystem. Again, it is noted that the second request will use the same block ID of the initial request to identify the requested data.

Presuming the request received in step 120 is a second or subsequent request, host node 42 in step 122 should find a match between the block ID of the second or subsequent request and the block ID of an entry in read history 66. When that match is discovered, the process proceeds to step 140, where the corresponding entry in read history 66 is checked for any unread mirrors. In step 140, if host node 42 determines that the read history entry having matching block ID is stale, then host node 42 deletes the stale entry in step 144 before proceeding to perform steps 124-134. Otherwise, if a yet unread mirror is found in step 140, the process proceeds to step 142 where host node 42 determines whether the read history entry having the matching block ID, is stale. Host node 42 determines whether the read history entry is stale in step 142 by comparing the current time with the time stamp of the read history entry having a matching block ID.

If the time stamp is less than a predetermined amount of time latter than the current time, the read history entry with the matching block ID is not stale, and the process proceeds to step 150 where 100 where host node 42 reads and returns to computer system 40 data read from a mirror not identified in the mirror read history field of the read history entry with a matching block ID. In step 152, host node 42 updates the read history field by adding the identity of the mirror from which data was read in step 100 and updates the time stamp to the current time. Note that the order of checks 122 and 140 can be reversed.

Although the preceding discussion describes a volume with 3 mirrors, the present invention works with as few as 2 mirrors and any number of mirrors greater than 3. In the preferred embodiment of this invention, the mirror read history field of the read history entry is implemented as a bitmap vector that enumerates all mirrors available for reading from 0 to the maximum number of mirrors supported by the implementation. In other implementations, the mirror read history field of a read history entry may be simplified or implemented in more complex ways well known in the art.

In some implementations, an optional dedicated cleaning procedure can be periodically invoked on the read history data structure, which looks for stale entries and removes them from the history. This cleaning enhances the performance of the searches on the read history.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
    receiving a first read request, wherein the first read request is received from a computer system;
    reading data from three or more mirrors of a data volume in response to receiving the first read request;
    returning data from a first of the three or more mirrors;
    comparing the data read from the three or more mirrors;
    creating a new entry in a memory if the data from at least two of the three or more mirrors do not compare equally, wherein the entry comprises an identification of data sought by the first read request;
    receiving a second read request, wherein the second read request is received from the computer system; and
    comparing an identification of data sought by the second request with identifications of data sought in respective entries stored in memory.

2. The method of claim 1 wherein the new entry further comprises an identity of the first mirror and a time stamp identifying a time when the first read request was received.

3. The method of claim 1 further comprising identifying a mirror of the three or more mirrors that has not yet been marked as read in the new entry in the memory.

4. The method of claim 3 further comprising reading data from the identified mirror and adding its identity the new entry in the memory and updating the timestamp.

5. A computer readable storage medium comprising instructions executable by a first computer system, wherein the first computer system performs a method in response to executing the instructions, the method comprising:
    receiving a first read request, wherein the first read request is received from a computer system;
    reading data from first and second mirrors of a data volume in response to receiving the first read request;
    comparing the data read from the first and second mirrors;
    creating a new entry in a searchable data structure if the data in the first and second mirrors do not compare equally, wherein the entry comprises an identification of data sought by the first read request;
    receiving a second read request, wherein the second read request is received from the computer system; and
    comparing an identification of data sought by the second request with identifications of entries in the searchable data structure.

6. The computer readable storage medium of claim 5 wherein
    the method further comprises an act of returning data from the first mirror to the computer system.

7. The computer readable storage medium of claim 6 wherein
    the new entry further comprises an identity of the first mirror and a time stamp identifying a time when the first read request was received.

8. A computer readable storage medium comprising instructions executable by a first computer system, wherein the first computer system performs a method in response to executing the instructions, the method comprising:
    reading data from first and second mirrors of a data volume in response to receiving a first read request from a computer system;
    comparing the data read from the first and second mirrors;
    creating a new entry in a searchable data structure if the data in the first and second mirrors do not compare equally, wherein the entry comprises an identification of data sought by the first read request; and
    in response to receiving a second read request from the computer system, comparing an identification of data sought by the second request with identifications of entries in the searchable data structure.

9. The computer readable storage medium of claim 8 wherein the method further comprises:
    returning data from the first mirror to the computer system.

10. The computer readable storage medium of claim 8 wherein the new entry further comprises
    an identity of the first mirror and a time stamp identifying a time when the first read request was received.

11. An apparatus comprising:
    means for receiving a first read request, wherein the first read request is received from a computer system;

means for reading data from three or more mirrors of a data volume, in response to a receipt of the first read request;

means for returning data from a first of the three or more mirrors;

means for comparing the data read from the three or more mirrors;

means for creating a new entry in a memory if the data from at least two of the three or more mirrors do not compare equally, wherein the entry comprises an identification of data sought by the first read request;

means for receiving a second read request, wherein the second read request is received from the computer system; and means for comparing an identification of data sought by the second request with identifications of data sought in respective entries stored in memory.

* * * * *